US012099525B2

(12) United States Patent
Balikov et al.

(10) Patent No.: US 12,099,525 B2
(45) Date of Patent: Sep. 24, 2024

(54) STATE REBALANCING IN STRUCTURED STREAMING

(71) Applicant: Databricks, Inc., San Francisco, CA (US)

(72) Inventors: Alexander Balikov, Kirkland, WA (US); Tathagata Das, New Haven, CT (US); Karthikeyan Ramasamy, Mountain View, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/219,314

(22) Filed: Jul. 7, 2023

(65) Prior Publication Data

US 2024/0202211 A1    Jun. 20, 2024

Related U.S. Application Data

(60) Provisional application No. 63/433,903, filed on Dec. 20, 2022.

(51) Int. Cl.
*G06F 16/27* (2019.01)
*G06F 16/2455* (2019.01)

(52) U.S. Cl.
CPC ...... *G06F 16/278* (2019.01); *G06F 16/24568* (2019.01)

(58) Field of Classification Search
None
See application file for complete search history.

(56) References Cited

U.S. PATENT DOCUMENTS

| 2005/0172089 | A1* | 8/2005 | Klingman | G06F 9/505 711/154 |
| 2005/0210178 | A1* | 9/2005 | Klingman | G06F 9/485 718/100 |
| 2013/0346988 | A1* | 12/2013 | Bruno | G06F 9/5066 718/102 |
| 2014/0172783 | A1* | 6/2014 | Suzuki | G06F 8/63 707/754 |
| 2018/0032373 | A1* | 2/2018 | Chen | G06F 9/5038 |
| 2019/0102435 | A1* | 4/2019 | Bishnoi | G06F 16/24568 |
| 2024/0012690 | A1* | 1/2024 | Rhu | G06F 9/4881 |

\* cited by examiner

*Primary Examiner* — Christopher J Raab
(74) *Attorney, Agent, or Firm* — Fenwick & West LLP

(57) ABSTRACT

A data processing service performs a rebalancing process for rebalancing stateful tasks on a cluster computing system. In one instance, the method for rebalancing stateful tasks is performed such that the per-operator partitions are spread across available executors of a cluster of the cluster computing system with respect to one or more statistics of the tasks. In one instance, the method for rebalancing stateful tasks is also performed such that the total number of stateful tasks are balanced per executor as long as this rebalancing does not imbalance the per-operator placements. In this way, the processing of stateful tasks can be spread across multiple executors in a relatively uniform manner, even though there may be an upfront cost of breaking the local caching on an executor.

20 Claims, 8 Drawing Sheets

STATE REBALANCING IN STRUCTURED STREAMING

CROSS-REFERENCE TO RELATED APPLICATIONS

This application claims the benefit of U.S. Provisional Patent Application No. 63/433,903, filed on Dec. 20, 2022, which is incorporated by reference in its entirety.

TECHNICAL FIELD

This disclosure relates generally to processing of streaming data, and more particularly to rebalancing tasks for state operations on streaming data.

BACKGROUND

A data processing service manages a significant amount of data for one or more entities in various forms, such as raw data or data tables. In some instances, the data processing service performs one or more operations on streaming data. In contrast to static data, streaming data may be continuously and dynamically ingested from a data source. Typically, the streaming data is processed by one or more clusters in a computing system. In one instance, the operator executed on the streaming data is a stateful operator, in which a state of the operator for a given partition of data at a current time depends on the state of the operator at a previous time. It is difficult to determine how the stateful tasks should be distributed on a cluster.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or computer system) for rebalancing stateful tasks on a cluster computing system. In one embodiment, the method for rebalancing stateful tasks is performed such that the per-operator partitions are spread across available executors of a cluster of the cluster computing system with respect to one or more statistics of the tasks. In one embodiment, the method for rebalancing stateful tasks is also performed such that the total number of stateful tasks are balanced per executor as long as this rebalancing does not imbalance the per-operator placements. In this way, the processing of stateful tasks can be spread across multiple executors in a relatively uniform manner, even though there may be an upfront cost of breaking the local caching on an executor.

Figure 1:
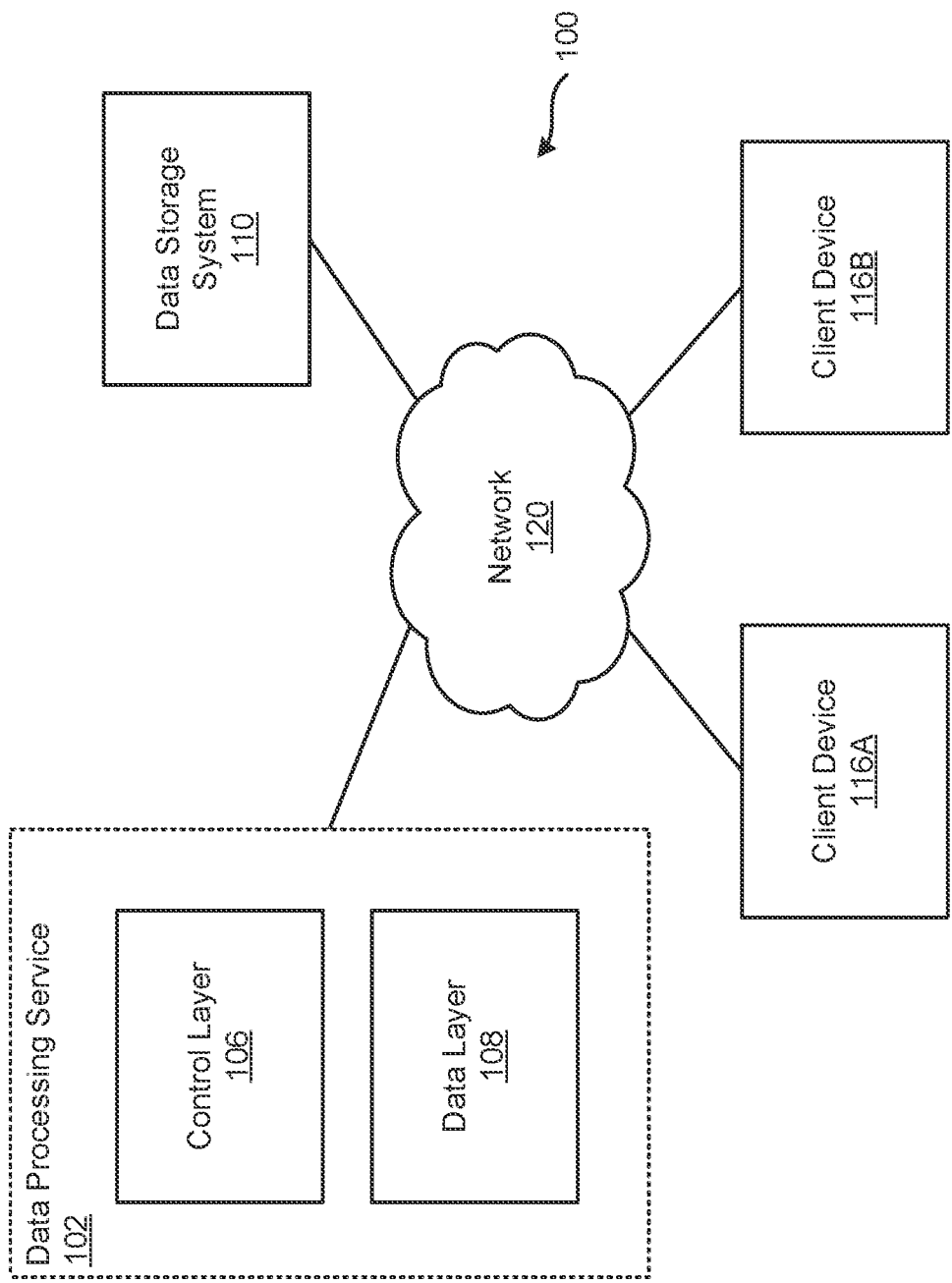
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices, e.g., 116A, 116B (generally 116), a network 120, a data processing service 102, and one or more data storage systems 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing service 102 may receive requests from users of client devices 116 to perform one or more data processing functionalities on data stored, for example, in the data storage system 110. The requests may include query requests, analytics and intelligence requests, or machine learning and artificial intelligence requests, on data stored in the data storage systems 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured on one or more servers and/or a cloud infrastructure platform. In one embodiment, the control layer 106 receives data processing requests and coordinates with the data layer 108 to process the requests received from the client devices 116. The control layer 106 may schedule one or more jobs related to a request or receive requests to execute one or more jobs from the user directly through a respective client device 116. The control layer 106 may distribute the jobs to components of the data layer 108 where the jobs are executed.

As described in more detail below, in one embodiment, the data processing service 102 provides a method by which stateful tasks are rebalanced on a cluster computing system for streaming data. Specifically, static data may be data that is first stored in a database (e.g., data storage system 110) and then processed. In contrast, streaming data may be data that is continuously and dynamically ingested from a data source and is processed as events before being stored in a database system. The data processing service 102 processes streaming data from one or more data sources. The data sources may be external or internal to the data processing service 102. Typically, the streaming data is processed by one or more clusters in a cluster computing system residing within, for example, the control layer 106 or the data layer 108. In one instance, the operator executed on the streaming data is a stateful operator, in which a state of the operator for a given partition of data at a current time depends on the state of the operator at a previous time.

Specifically, for an incoming stream of data records, the data processing service 102 partitions the streamlining data into a set of partitions. Each partition, for example, may correspond to data for a respective subset of keys. As an example, the streaming data may be a clickstream of user clicks for a content item, and when the keys are user identifiers, one partition may refer to the clickstream data for a respective subset of users. The data processing service 102 includes a cluster computing system including one or more clusters. A cluster includes a driver node and one or more executors that each include a respective set of task executors. The data processing service 102 may distribute one or more partition tasks across the executors of a cluster. One task executor may be responsible for executing a corresponding partition task.

In particular, a partition task may be defined as an execution of a stateful operator on a partition of the streaming data. For example, the stateful operator may be to aggregate and count, for each user, the number of clicks made every minute the data is streamed. The partition task may be performed per microbatch, which is an interval boundary of data (e.g., every minute, every second) that is processed by the partition task. A partition task thus may maintain state information (e.g., number of clicks) for the respective subset of keys, where the state information for the current microbatch is dependent on the state information for one or more previous microbatches (e.g., preceding microbatch).

In certain instances, the data processing service 102, and in particular, a driver node of a cluster may assign the stateful partition tasks to the same executor they were assigned to before. This is because since stateful operators maintain a state across microbatches, the state is cached on the local disk and/or cache of an executor, and the partitions tasks for a current batch are assigned to the same executor they were assigned to for a previous batch since the state stored in the local disk or executor cache can be taken advantage of. However, this behavior may prevent the stateful operator execution to take advantage of new executors when clusters are scaled up in the cluster computing system.

Thus, in one embodiment, the data processing service 102 receives, at a first time, a first batch of data that includes data associated with one or more keys. The data processing services 102 schedules a set of partitions tasks for the first batch of data on one or more executor nodes. A partition task may correspond to a stateful operator on data associated with a respective subset of keys. The data processing service 102 executes the set of partition tasks by the one or more executor nodes based on the first batch of data. An executor node may execute a respective subset of partition tasks and stores a state for the respective subset of partitions tasks to storage. The data processing service 102 receives placement information that indicate locations of the one or more partition tasks on the one or more executor nodes. By rebalancing stateful partition tasks in this manner, task assignments can be distributed differently between microbatches, such that existing and new compute resources in the cluster can be leveraged and taken advantage of efficiently.

The data processing service 102 receives a second batch of data at a second time including additional data associated with the one or more keys. The preferred locations of the set of partition tasks for the second batch of data are computed. The preferred locations may indicate assignment of at least one partition task on an executor node to another executor node. The data processing service 102 schedules the set of partition tasks for the second batch according to the computed preferred locations. The at least one partition task is executed by another executor node based on the second batch of data responsive to retrieving the state for the at least one partition task from the storage.

Returning to the discussion of FIG. 1, the control layer 106 of the data processing service 102 is additionally capable of configuring clusters in the data layer 108 that are used to execute tasks for streaming data. For example, a user of a client device 116 may submit a request to perform one or more query operators on the incoming data and may specify a number of clusters (e.g., four clusters) on the data layer 108 be activated to process the request with certain memory requirements. Responsive to receiving this information, the control layer 106 sends instructions to the data layer 108 to instantiate the requested number of clusters and configure the clusters according to the requested memory requirements.

The data layer 108 includes multiple instances of clusters of computing resources that execute one or more operations received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. A tenant of the data processing service 102 may be an entity (e.g., business organization, university, individual user) that may be associated with an established account of the data processing service 102. The data processing service 102 may allocate storage to store data for a tenant and/or computing resources to perform one or more processing operations on the data for the tenant. For example, a respective data layer instance can be implemented for each respective tenant. However, it is appreciated that the data layer 108 can also be configured as a single tenant architecture.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data configured on a cloud platform and may include a commercially provided distributed storage system service. Thus, the data storage system 110 may be managed by the same entity that manages the data processing service 102 or by a separate entity than an entity that manages the data processing service 102. In one embodiment, the data storage system 110 may be included in the data layer 108.

In one embodiment, the data storage system 110 may store the results of operators executed on streaming data for a tenant. For example, as the cluster computing system executes operations on streaming data, the results of the operations (e.g., state information) per microbatch may be stored in a data storage system 110 dedicated to the tenant managing the data. Moreover, the data storage system 100 may also store metadata on the streaming data and results of executing operations on the streaming data, including metadata checkpoint files.

The client devices 116 are computing devices that provide for display of information to users and communicate user actions to the systems of the system environment 100. While two client devices 116A, 116B are illustrated in FIG. 1, in practice many client devices 116 may communicate with the systems (e.g., data processing service 102) of the system environment 100. In one embodiment, a client device 116 is a conventional computer system, such as a desktop or laptop computer. As another example, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one example embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the systems of the system environment 100 through a web interface or an application programming interface (API) running on a native operating system of the client device 116, such as IOS® or ANDROID™.

Data Storage System

Figure 2:
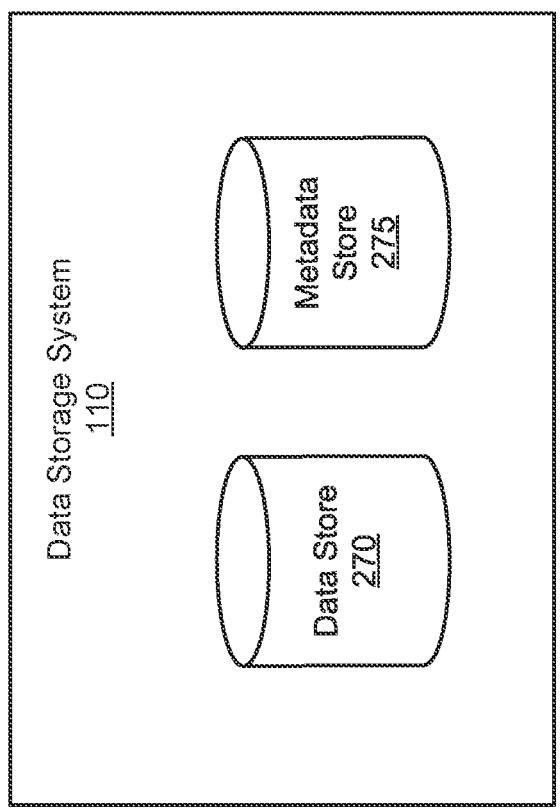
FIG. 2 illustrates a block diagram of an architecture of the data storage system, in accordance with an embodiment.

FIG. 2 illustrates a block diagram of an architecture of the data storage system 110, in accordance with an embodiment. As illustrated in FIG. 2, the data storage system 110 includes a data store 270 and a metadata store 275. The data storage system 110 may have multiple instances of the data store 270 and the metadata store 275, each dedicated to storing data for a tenant of the data processing service 102. In one embodiment, the data store 270 stores data in a format of a data table. A data table may include a set of records, where each record may include values for one or more features or keys. A feature may represent a measurable piece of data that can be used for analysis, such as, login account, timestep, etc. A feature may refer to any characteristic of the data that can be associated with one or more values of various data types, such as discrete or continuous values, string values, and the like. In one embodiment, the records may span across multiple rows of the data table and the features may span across multiple columns of the data table. In other embodiments, the records may span across multiple columns and the features may span across multiple rows. For example, a data table associated with a company may include a plurality of records each corresponding to a login instance of a respective user to a website, where each record includes values for a set of features including user login account, timestamp of attempted login, whether the login was successful, and the like.

In one embodiment, a data table may be stored in the data store 270 in conjunction with metadata stored in the metadata store 275. As described above, the metadata store 275 may include one or more metadata files for a data table. In some embodiments, the metadata store 275 stores metadata in the form of one or more transaction logs. A transaction log for a data table is a log recording a sequence of transactions that were performed on the data table. A transaction may perform one or more changes to a data table that may include removal, modification, or addition of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110. The metadata in the transaction log may record removal, update, or addition of data files to a data table.

Control Layer

Figure 3:
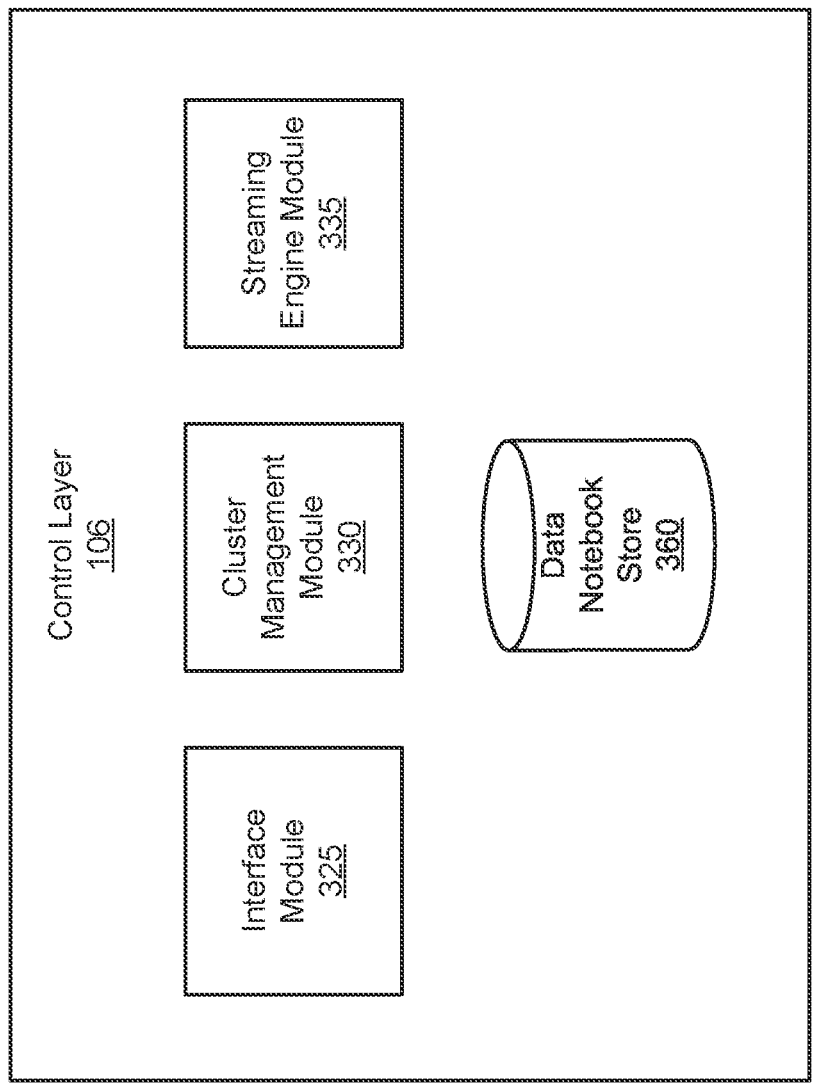
FIG. 3 is a block diagram of an architecture of a control layer, in accordance with an embodiment.

Referring now to FIG. 3, illustrated is a block diagram of an architecture of a control layer 106, in accordance with some example embodiments. As shown, the control layer 106 includes an interface module 325, a cluster management module 330, a streaming engine module 335, and a data notebook store 360.

The interface module 325 provides an interface and/or a workspace environment where users of client devices 116 (e.g., users associated with tenants) can access resources of the data processing service 102. For example, the user may retrieve information from data tables associated with a tenant and submit data processing requests, such as query requests on the data tables, through the interface provided by the interface module 325. The interface provided by the interface module 325 may include electronic notebooks, libraries, experiments (e.g., data and/or analysis), and/or queries submitted by the user. In some embodiments, a user may access the workspace via a user interface (UI), a command line interface (CLI), and/or through an application programming interface (API) provided by the interface module 325.

In some embodiments, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The cluster management module 330 manages clusters created in the data layer 108 and/or the control layer 106. In one embodiment, the cluster management module 330 manages the lifecycle of clusters in a workspace environment of a tenant. For example, the cluster management module 330 may create a cluster, configure settings for the cluster, and terminate a cluster in the workspace environment. For example, a user of a client device 116 with access to a workspace may request creation of one or more clusters in the data layer 108 and configure various settings, such as access settings, security settings, node type, and processor settings, and the like. As another example, the cluster management module 330 may obtain information on the use of resources of each cluster and display such information not the user. The cluster management module 330 may also terminate the clusters upon user request or the user can also configure auto-termination after a predetermined period of time through the cluster management module 330.

The streaming engine module 335 receives requests to process streaming data from one or more data sources. The requests may include, for example, requests to ingest data from file sources for reading files written in a file directory as a stream of data, a streaming platform (e.g., Kafka) source that reads data from a streaming platform, or a socket source that reads UTF8 text or other modalities of data from a socket connection. The requests may also include requests to perform one or more operators on the streaming data. In one embodiment, the operator on a stream of data is a stateful operator, in which the result of performing the operator at a current time (e.g., for a current microbatch of data) is dependent on state information at a previous time (e.g., for a previous microbatch of data). The streaming engine module 335 manages clusters in the data layer 108 (or the control layer 106) to ingest stream of data from the requested data source and perform one or more stateful operators on the data.

Figure 4:
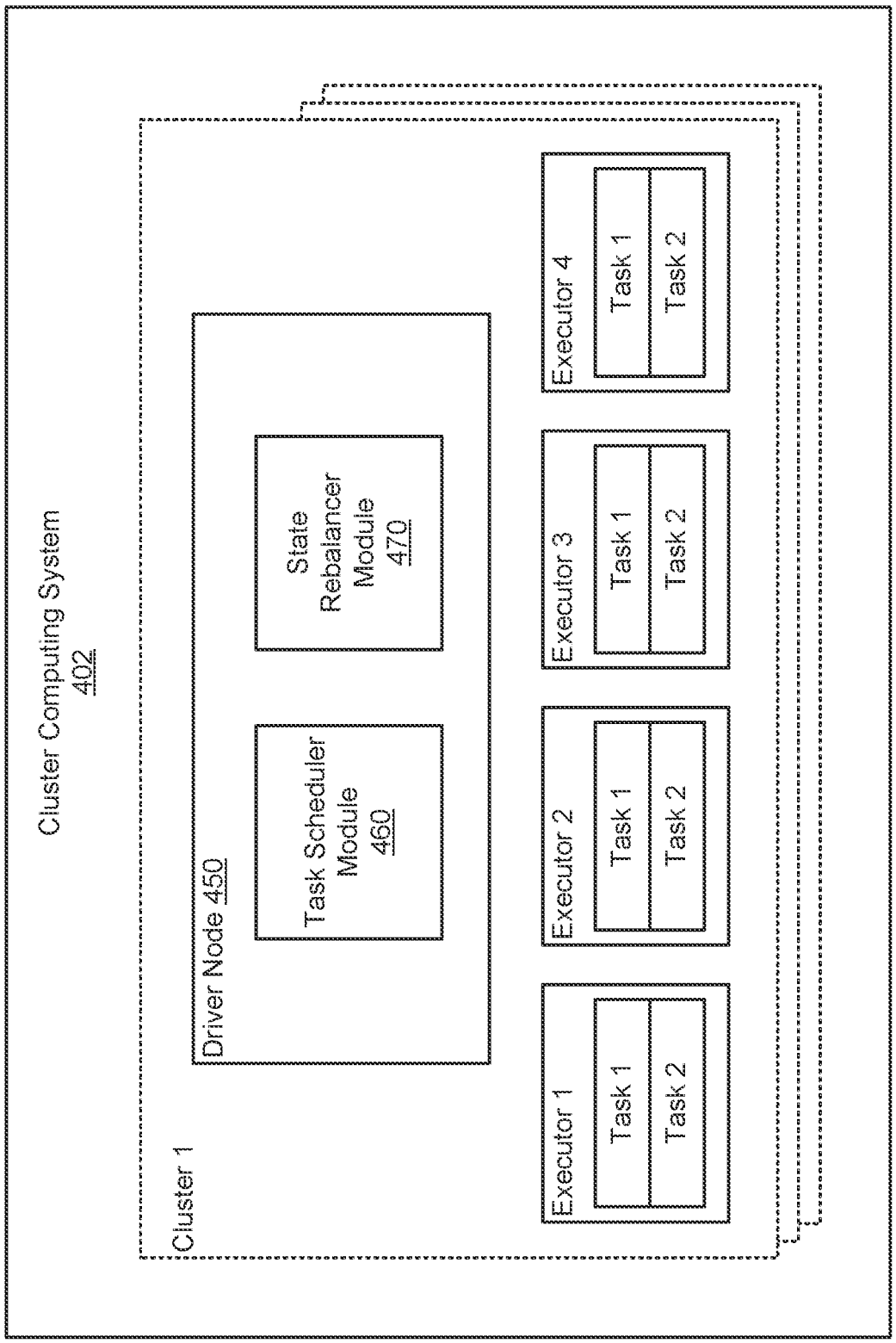
FIG. 4 is a block diagram of an architecture of a cluster computing system, in accordance with an embodiment.

FIG. 4 is a block diagram of an architecture of a cluster computing system 402, in accordance with an embodiment. In one embodiment, the cluster computing system 402 may be configured in the data layer 108 and/or the control layer 106 upon request by a user. In some embodiments, the cluster computing system 402 includes driver node 450 and worker pool including a set of executors. The driver node 450 receives one or more jobs for execution, optionally divides a job into job stages, and provides job stages to executors, receives job stage results from the executors of the worker pool, and assembles job stage results into complete job results, and the like.

The worker pool can include any appropriate number of executor nodes (e.g., 4 executors, 12 executors, 256 executors). Each executor in the worker pool includes one or more task engines for executing one or more tasks. In one embodiment, a task engine performs single-threaded task execution in which a task is processed using a single thread of the CPU. In one embodiment, an executor is configured with a local disk or cache that can be used by the task engines of the executor to store information, such as state information after executing a partition task for a current microbatch. The executor distributes one or more tasks (e.g., for a job stage) to one or more task engines and provides the results of the execution to the driver node 450.

In one embodiment, the driver node 450 receives from the streaming engine module 335 requests from users to ingest streaming data from one or more data sources, and requests to execute one or more stateful operators on the streaming data. In one embodiment, the driver node 450 receives requests to execute two or more types of stateful operators on streaming data. For example, for streaming data including a stream of sensor data for one or more sensors on equipment (e.g., farming equipment, industrial equipment, transportation vehicles), a first request may request to perform a stateful operator of aggregate, and a second request may request to perform a stateful operator of join on the streaming data.

For a current microbatch, the driver node 450 partitions the batch of data into a set of partition tasks and distributes the partition tasks to the executors of the cluster. In one instance, each partition task is identified by generating a hash for one or more key values (e.g., sensor identifiers or user identifiers). Thus, a partition task may be dedicated to performing a stateful operator on a subset of records in the microbatch with a hash value matching the hash value for the partition task. In one instance, the driver node 450 assigns one partition task to one task engine of a respective executor in a cluster. However, it is appreciated that in other embodiments, a partition task may be assigned to multiple task engines or one task engine may process multiple partition tasks.

The driver node 450 obtains placement information from various executors of the cluster, such that the driver node 450 can determine the load for each executor with respect to one or more execution statistics. In one primary example referred throughout the remainder of the specification, the execution statistics are a number of partition tasks on an executor. However, it is appreciated that the rebalancing can occur with respect to the processing times of partition tasks on an executor, the size of partition tasks on an executor, latency of the partition tasks on an executor, and the like. The driver node 450 also obtains cluster events that indicate when an executor joins or leaves the cluster. In this manner, the driver node 450 is able to rebalance and redistribute partition tasks for a current microbatch to improve load uniformity across different executors.

As shown in FIG. 4, in one embodiment, the driver node 450 includes a task scheduler module 460 and a state rebalancer module 470, according to one embodiment. For the first microbatch, the task scheduler module 460 may request the state rebalancer module 470 whether there are preferred locations for the partition tasks. Since there are no partition tasks yet executed on the set of executors, the state rebalancer module 470 responds with an empty response. Responsive to receiving the empty response, the task scheduler module 460 may schedule partition tasks at random on the available set of executors. This process may be repeated for partition tasks of additional stateful operators that are to be executed on the cluster.

The task engines of the executors execute the assigned partition tasks. In one embodiment, the task engines of a respective executor may store state information for the current microbatch to the local disk or cache of the executor, such that the partition tasks of the next microbatch can access the state information. The state information for a current microbatch is also stored to cloud storage, for example, to a root bucket of the data storage system 110 for the tenant. After the execution is complete, the executor provides one or more execution statistics to the state rebalancer module 470. The execution statistics may include processing times for each partition task executed on a respective task engine, number of partition tasks executed on the executor, and the like.

The state rebalancer module 470 receives the execution statistics from the set of executors on a cluster. Based on the received statistics, the state rebalancer module 470 generates a view of the partition task placement on a respective executor and the relevant execution statistics for the executor. The view includes the available executors for the cluster.

At a second time, the state rebalancer module 470 receives indication of a start of a new microbatch (e.g., second microbatch). The state rebalancer module 470 computes new placement information for the microbatch by performing a rebalancing process based on the execution statistics. Further details of the rebalancing process are described below. For the new microbatch, the task scheduler module 460 requests the state rebalancer module 470 whether there are preferred locations for the partition tasks. The state rebalancer module 470 provides as a response the preferred locations that were computed at the start of the new microbatch. The task scheduler module 460 uses preferred locations to place the partition tasks for the second microbatch. Moreover, anytime an executor joins or leaves the cluster, the state rebalancer module 470 receives a notification of such an event. The state rebalancer module 470 updates the view based on the received event and may recompute the placement information at the next microbatch or at the start of the current microbatch if possible.

In one embodiment, the rebalancing process performed by the state rebalancer module 470 at the start a microbatch may satisfy one or more conditions given a set of available executors of the cluster in the view. In one instance, a first condition is for a given stateful operator, task partitions for the operator are spread across the available set of executors with respect to one or more execution statistics (e.g., number of partition tasks, processing times and/or latency of partition tasks, size of partition tasks). For example, if there are 2 stateful operators with 10 task partitions each and 2 executors A and B, placing 5 partitions for each operator on each executor may be significantly better than placing all partition tasks for the first operator on executor A and all task partitions of the second operator on executor B, as pipeline stages are executed roughly in sequence and the former scenario allows for improved utilization per stage.

In one instance, to satisfy the first condition, the state rebalancer module 470 performs a first pass of rebalancing process. The state rebalancer module 470 builds a min heap and a max heap with the set of available executors in the cluster based on the execution statistics (e.g., number of partition tasks) of each executor for a specific stateful operator. A min heap is a binary (or other) tree in which the root node represents the executor with the lowest execution statistic (e.g., lowest number of partition tasks from the previous microbatch) and an executor represented by a parent node of the tree has a lower value than executors represented by the child nodes. A max heap is a binary (or other) tree in which the root node represents the executor with the highest execution statistic (e.g., highest number of partition tasks from the previous microbatch) and an executor represented by a parent node of the tree has a higher value than executors represented by the child nodes.

The state rebalancer module 470 selects the top executors from each heap or executors that have execution statistics above or below a certain threshold. For example, the state rebalancer module 470 selects the executor (e.g., first executor) of the root node from the min heap and the executor (e.g., second executor) of the root node from the max heap. If the condition that the number of partition tasks (or processing time or latency) of the selected executor from the min heap (i.e., $\min_{operator}$) is equal to or larger than the number of partition tasks (or processing time or latency) of the selected executor from the max heap (i.e., $\max_{operator}$) minus one (i.e., $\min_{operator} \geq \max_{operator} - 1$), the rebalancing process is completed. Otherwise, the state rebalancer module 470 moves $(\max_{operator} - \min_{operator})/2$ partition tasks from the executor selected from the max heap to the executor from the min heap. The selected executors are inserted back to the heaps. This process is repeated until the condition is met.

In one instance, a second condition is for the total number of stateful task partitions per executor are spread across the available set of executors with respect to one or more execution statistics (e.g., number of partition tasks, processing times and/or latency of partition tasks). This is because the state information for stateful operators executed on an executor are cached in the executor memory and/or uses executor disk resources.

In one instance, to satisfy the second condition, the state rebalancer module 470 performs a second pass of the rebalancing process. The state rebalancer module 470 builds a min heap and a max heap with the set of available executors in the cluster based on the execution statistics of each executor across all stateful operator tasks (e.g., total number of partition tasks on an executor, total latency of partition tasks on executor, total size of partition tasks on the executor). The state rebalancer module 470 moves partition tasks if $\min_{executor} < \max_{executor} - 1$ of the total stateful partition statistics, where min is the lowest execution statistic among the executors and max is the highest execution statistic among the executors.

In one instance, the state rebalancer module 470 moves at most 1 partition task per stateful operator so that the previous process of rebalancing the partition tasks per operator is not broken. Specifically, the state rebalancer module 470 selects the top executors from each heap or executors that have execution statistics above or below a certain threshold. Different from the first condition, the second condition may specify execution statistics across all state operators on an executor. For example, the state rebalancer module 470 selects the executor (e.g., third executor) of the root node from the min heap associated with the lowest execution statistic and the executor (e.g., fourth executor) of the root node from the max heap associated with the highest execution statistic. If the condition that the number of partition tasks (or processing time or latency) of the selected executor from the min heap (i.e., $\min_{executor}$) is equal to or larger than the number of partition tasks (or processing time or latency) of the selected executor from the max heap (i.e., $\max_{executor}$) minus one (i.e., $\min_{executor} \geq \max_{executor} - 1$), the rebalancing process is completed.

Otherwise, the state rebalancer module 470 iterates over the stateful operators, and if the execution statistic of a particular stateful operator of the selected max executor is greater than the corresponding execution statistic of the stateful operator of the selected min executor (i.e., different is at most 1 partition task (or a different value) due to the previous process), the state rebalancer module 470 moves 1 partition task from the max executor to the min executor for that stateful operator. The process is repeated for other stateful operators until the condition $\min_{executor} \geq \max_{executor} - 1$ is satisfied. If not, the executors are inserted back to the heaps. This process is repeated until the condition is satisfied.

The state rebalancer module 470 stops computation of the rebalancing process when the first condition and/or the second condition has been satisfied. The state rebalancer module 470 provides the placement information to the task scheduler module 460, such that the partition tasks are scheduled according to the placement information for the next microbatch. In particular, when a partition task previously executed on one executor but is now rebalanced to a different executor for a next microbatch, the partition task may retrieve the state information for the subset of keys from cloud storage. While moving partition tasks to new executors may introduce some latency since the partition tasks incur I/O costs to retrieve state information from cloud storage, in the long-run, the rebalancing process may better utilize compute resources on the cluster and allow the stateful operators to be executed more efficiently.

Moreover, in one embodiment, the state rebalancing module 470 may adjust the frequency of the rebalancing process as appropriate. For example, the rebalancing module 470 may perform the rebalancing process every microbatch, every two microbatches, or every 10 microbatches of data. In one embodiment, the state rebalancing module 470 may adjust the frequency based on whether a pipeline can afford short-term scheduling latency and avoid too much overhead in low latency scenarios. In one embodiment, the state rebalancing module 470 can be notified at every start of a microbatch, but performs rebalancing if a new executor has joined the cluster, and/or if a predetermined time (e.g., 5 minutes, 10 minutes, 30 minutes) has passed since the last rebalancing process.

As one particular example, a cluster may maintain a single executor A. The cluster may run a pipeline with 3 stateful operators with (9, 1, 1) partition tasks, respectively. The state information for each stateful operator may be stored in cloud storage and also on the local cache of executor A. A second executor B may join the cluster because, for example, resources may have freed up. The state rebalancing module 470 may perform the first pass of the rebalancing process to generate a partition task placement of A: (5, 1, 1), B: (4, 0, 0). Thus, the set of partition tasks per stateful operator are moved until the condition $min_{operator} \geq max_{operator} - 1$ (or any constant) is satisfied. However, the number of partition tasks per executor may still be imbalanced since A has 7 partition tasks and B has 4 partition tasks.

The state rebalancing module 470 may perform the second pass of the rebalancing process to generate a second partition placement of A: (4, 1, 1), B: (5, 0, 0). Thus, the total number of partition tasks per executor changed such that A has 6 partition tasks and B has 5 partition tasks, which is balanced. Also, the per-operator balancing was not broken since the per stateful operator count difference is still less than 1. The state rebalancing module 470 provides the placement information to the task schedule 460 to place 4 partition tasks for the first operator, 1 partition task for the second operator, and 1 partition task for the third operator on executor A, and place 5 partition tasks for the first operator on executor B. Since the 5 partition tasks on executor B were moved from executor A, for the next microbatch, the 5 partition tasks may retrieve the state information for the 5 partitions from cloud storage.

Example Rebalancing Process of Partition Tasks

Figure 5:
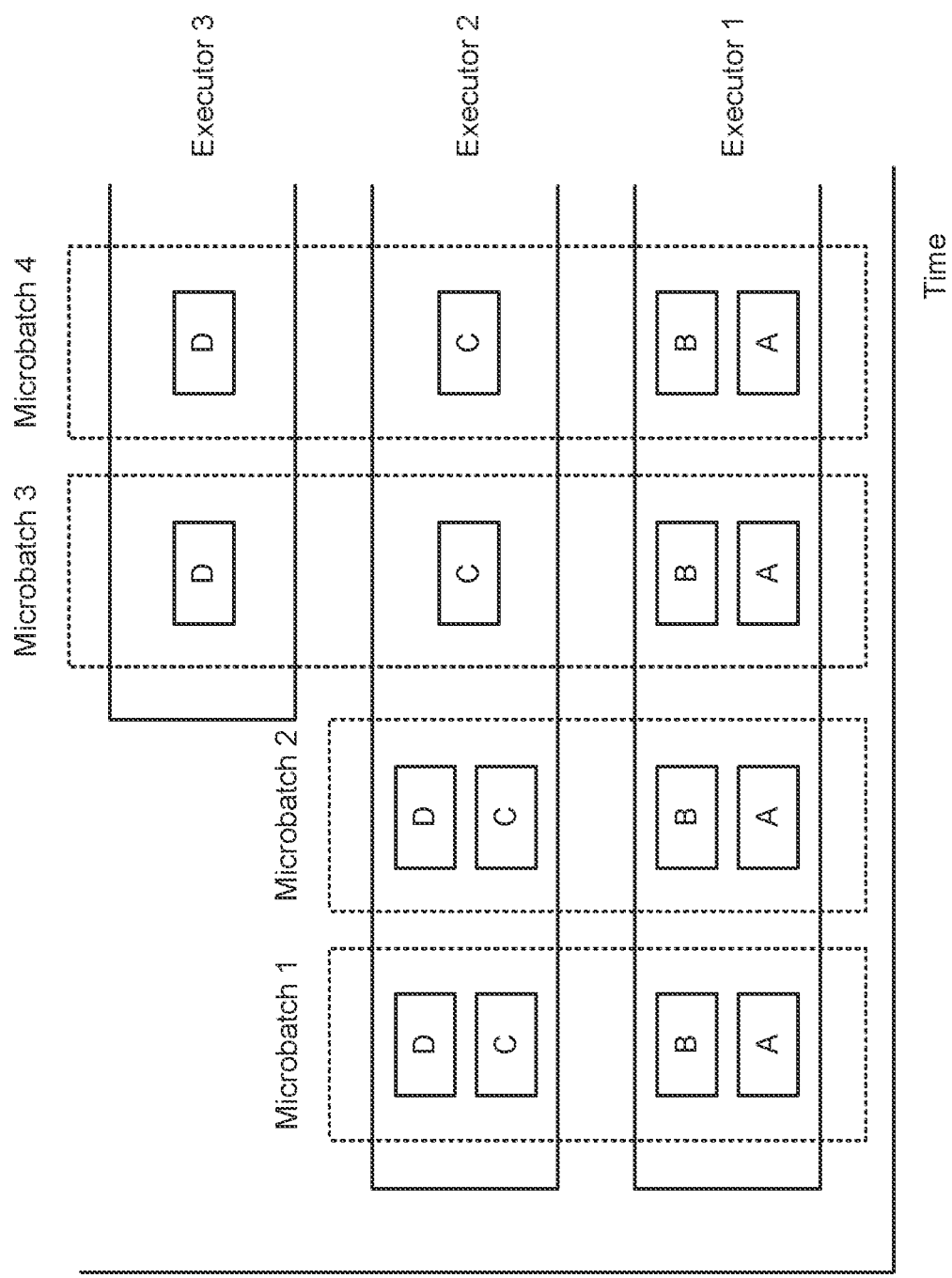
FIG. 5 is an example illustration of rebalancing stateful tasks across executors of the cluster computing system, in accordance with an embodiment.

FIG. 5 is an example illustration of rebalancing stateful tasks across executors of the cluster computing system, in accordance with an embodiment. The process shown in FIG. 5 may be performed by one or more components (e.g., the driver node 450, the task scheduler module 460, and/or the state rebalancing module 470) of a data processing system/service (e.g., the data processing service 102).

Specifically, the example in FIG. 5 illustrates rebalancing of partition tasks as a function of time. For the first microbatch, the set of partition tasks A, B, C, D for a stateful operator are executed on executors 1 and 2. For example, the partition task A may be to obtain a count of clickstream data for a respective subset of users. The results of the operator may be stored on cloud storage and on local cache of each executor. For the second microbatch, the set of partition tasks for the stateful operator are again executed on executors 1 and 2. The state information stored on the cloud storage and the local cache may be updated to incorporate the second microbatch of data. Before the start of the third microbatch, the state rebalancer module 470 receives indication that a new executor, executor 3, has joined the cluster. The state rebalancer module 470 performs a rebalancing process, and generates placement information in which executor 1 should have 2 partition tasks, executor 2 should have 1 partition task, and executor 3 should have 1 partition tasks. The task schedule 460, based on the placement information, schedules partition task D to be executed on executor 3 for the third microbatch. In particular, partition task D may retrieve state information from cloud storage before executing the operator on the third microbatch. For the fourth microbatch, the set of partition tasks may be again executed across three executors, utilizing compute resources across all available executors.

Flowchart for Rebalancing Process of Partition Tasks for Stateful Operators

Figure 6A:
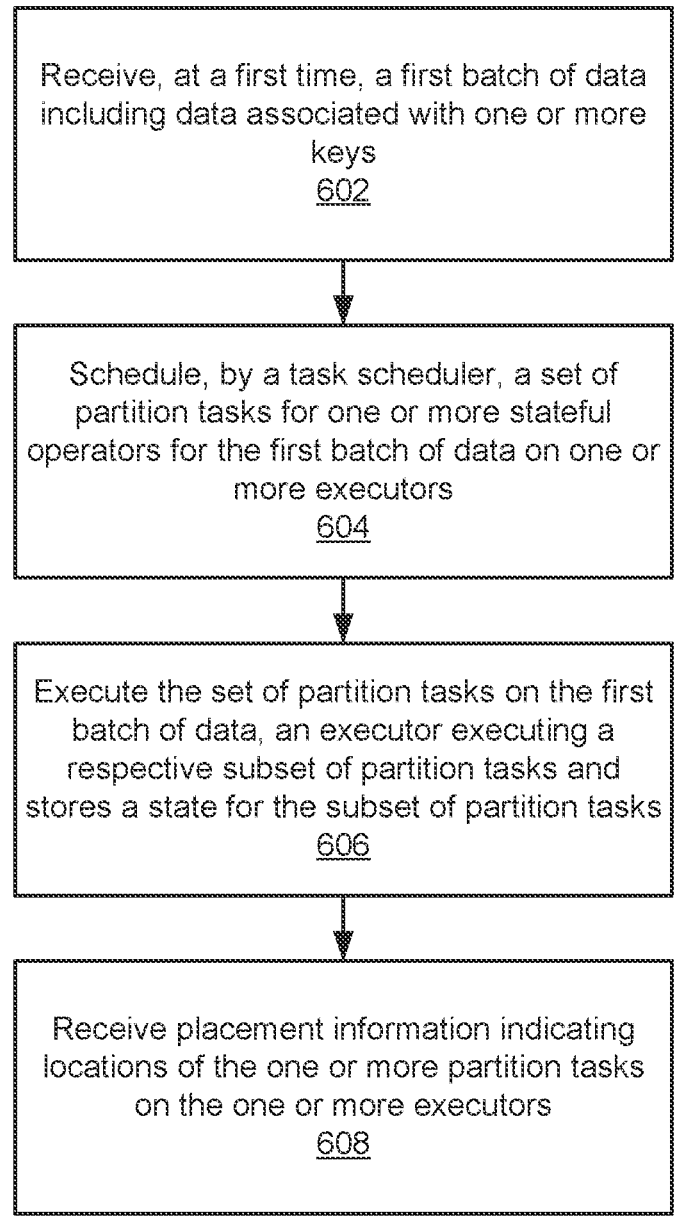
FIGS. 6A-6B is a flowchart of a method for rebalancing partition tasks for stateful operators, in accordance with an embodiment.
Figure 6B:
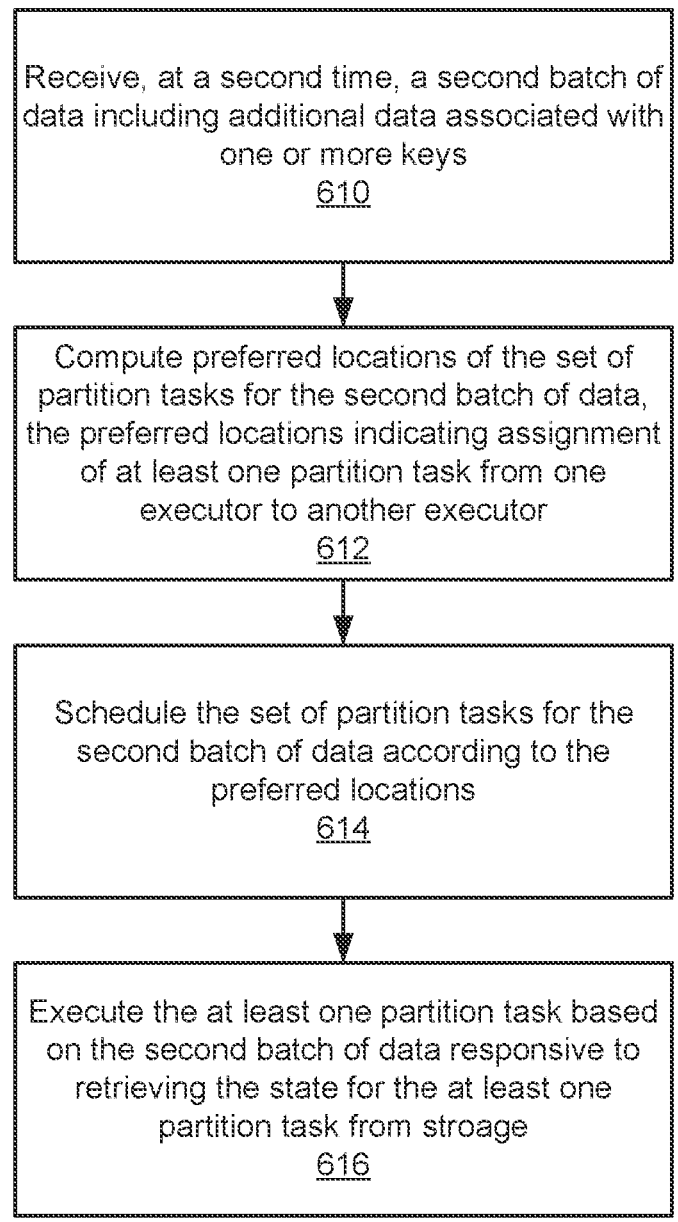

FIGS. 6A-6B is a flowchart of a method for rebalancing partition tasks for stateful operators, in accordance with an embodiment. The process shown in FIGS. 6A-6B may be performed by one or more components (e.g., the driver node 450, the task scheduler module 460, the state rebalancing module 470) of a data processing system/service (e.g., the data processing service 102). Other entities may perform some or all of the steps in FIGS. 6A-6B. The data processing service 102 as well as the other entities may include some or of the component of the machine (e.g., computer system) described in conjunction with FIG. 7. Embodiments may include different and/or additional steps, or perform the steps in different orders.

The data processing service 102 receives 602, at a first time, a first batch of data including data associated with one or more keys. The data processing service 102 schedules 604, by a task scheduler, a set of partition tasks for one or more stateful operators for the first batch of data on one or more executor. In one embodiment, a partition task corresponds to a respective stateful operator on data associated with a respective subset of keys. The data processing service 102 executes 606, by the one or more executors, the set of partition tasks on the first batch of data. In one embodiment, an executor executes a respective subset of partition tasks and stores a state for the respective subset of partitions tasks to storage. The storage may be cloud storage. The data processing service 102 receives 608, by a state rebalancer component, placement information indicating locations of the one or more partition tasks on the one or more executors.

The data processing service 102 receives 610, at a second time subsequent the first time, a second batch of data including additional data associated with the one or more keys. The data processing service 102 computes 612, by a state rebalancer component, preferred locations of the set of partition tasks for the second batch of data. In one embodiment, the preferred locations indicate assignment of at least one partition task on an executor to another executor. The data processing service 102 schedules 614, by the task scheduler, the partition tasks for the second batch of data according to the preferred locations. The data processing service 102 executes 616, by the another executor, the at least one partition task based on the second batch of data responsive to retrieving the state for the at least one partition task from the storage.

Figure 7:
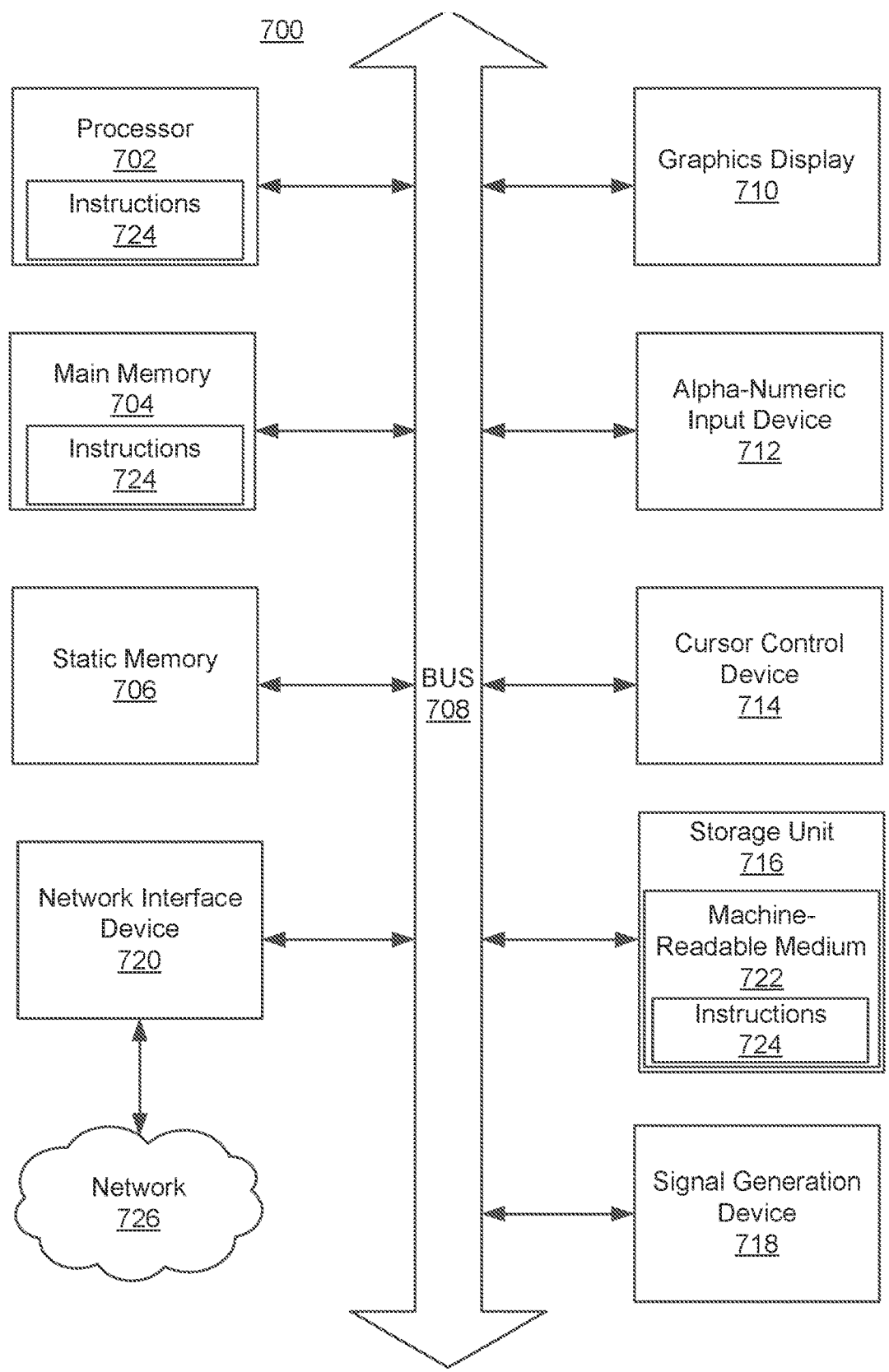
FIG. 7 is a block diagram illustrating an example machine to read and execute computer readable instructions, in accordance with an embodiment.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method, comprising:
   receiving, at a first time, a first batch of data including data associated with one or more keys;
   scheduling a set of partition tasks for one or more stateful operators for the first batch of data on one or more executors, a partition task corresponding to a respective stateful operator on data associated with a respective subset of keys;
   executing the set of partition tasks on the first batch of data, an executor executing a respective subset of partition tasks and stores a state for the respective subset of partitions tasks to storage;
   receiving placement information indicating locations of the set of partition tasks on the one or more executors;
   receiving, at a second time subsequent the first time, a second batch of data including additional data associated with the one or more keys;
   computing preferred locations of the set of partition tasks for the second batch of data, the preferred locations indicating assignment of at least one partition task on an executor to another executor based on an execution statistic;
   scheduling the set of partition tasks for the second batch of data according to the preferred locations; and
   executing, by the another executor, the at least one partition task based on the second batch of data responsive to retrieving the state for the at least one partition task from the storage.

2. The method of claim 1, wherein the execution statistic for an executor is one or a combination of a number of partition tasks executed on the executor, a size of partition tasks executed on the executor, or a latency or processing time for executing partition tasks on the executor.

3. The method of claim 1, computing the preferred locations of the set of partition tasks further comprising:
   for a stateful operator, performing for one or more iterations:
      based on the placement information for a current iteration, selecting a first executor with a first execution statistics for the subset of partition tasks and a second executor with a second execution statistics for the subset of partition tasks;
      if the first execution statistic and the second execution statistic satisfy a condition, using the placement information of the current iteration to generate the preferred locations for the second batch of data;
      else, moving a number of partition tasks from the second executor to the first executor;
      updating the placement information with updated execution statistics reflecting the partition tasks moved from the second executor to the first executor; and
      proceeding to the next iteration by setting the updated placement information as the placement information for the next iteration.

4. The method of claim 3, wherein the first executor is an executor with the first execution statistic that is a lowest execution statistic for the subset of partition tasks assigned to the stateful operator and the second executor is an executor with the second execution statistic that is a highest execution statistic for the subset of partition tasks assigned to the stateful operator.

5. The method of claim 1, the one or more stateful operators comprising two or more stateful operators, and computing the preferred locations of the set of partition tasks further comprising:
   for one or more iterations:
      based on the placement information for a current iteration, selecting a third executor with a third execution statistic for the subset of partition tasks assigned to the two or more stateful operators and a fourth executor with a fourth execution statistic for the subset of partition tasks assigned to the two or more stateful operators;
      if the third execution statistic and the fourth execution statistic satisfy a second condition, using the placement information of the current iteration to generate the preferred locations for the second batch of data;
      else, iteratively performing, for each stateful operator:
         moving a number of partition tasks assigned to the stateful operator from the fourth executor to the third executor until the second condition for the third executor and the fourth executor is satisfied;
      updating the placement information with updated execution statistics reflecting the partition tasks moved from the fourth executor to the third executor; and
      proceeding to the next iteration by setting the updated placement information as the placement information for the next iteration.

6. The method of claim 5, wherein the third executor is an executor with the third execution statistic that is a lowest execution statistic for the subset of partition tasks assigned to the two or more stateful operators and the fourth executor is an executor with the fourth execution statistic that is a highest execution statistic for the subset of partition tasks assigned to the two or more stateful operators.

7. The method of claim 1, the state for the respective subset of partitions tasks stored to a cloud object storage and also stored on a cache memory of the executor.

8. A non-transitory computer readable medium comprising stored instructions, the stored instructions when executed by at least one processor of one or more computing devices, cause the one or more computing devices to:
   receive, at a first time, a first batch of data including data associated with one or more keys;

schedule a set of partition tasks for one or more stateful operators for the first batch of data on one or more executor, a partition task corresponding to a respective stateful operator on data associated with a respective subset of keys;
execute the set of partition tasks on the first batch of data, the instructions further causing an executor to execute a respective subset of partition tasks and store a state for the respective subset of partitions tasks to storage;
receive placement information indicating locations of the set of partition tasks on the one or more executors;
receive, at a second time subsequent the first time, a second batch of data including additional data associated with the one or more keys;
compute preferred locations of the set of partition tasks for the second batch of data, the preferred locations indicating assignment of at least one partition task on an executor to another executor based on an execution statistic;
schedule the set of partition tasks for the second batch of data according to the preferred locations; and
execute, by the another executor, the at least one partition task based on the second batch of data responsive to retrieving the state for the at least one partition task from the storage.

9. The non-transitory computer readable medium of claim 8, the execution statistic for an executor one or a combination of a number of partition tasks executed on the executor, a size of partition tasks executed on the executor, or a latency or processing time for executing partition tasks on the executor.

10. The non-transitory computer readable medium of claim 8, the instructions causing the computing devices to:
for a stateful operator, perform for one or more iterations:
based on the placement information for a current iteration, select a first executor with a first execution statistics for the subset of partition tasks and a second executor with a second execution statistics for the subset of partition tasks;
if the first execution statistic and the second execution statistic satisfy a condition, use the placement information of the current iteration to generate the preferred locations for the second batch of data;
else, move a number of partition tasks from the second executor to the first executor;
update the placement information with updated execution statistics reflecting the partition tasks moved from the second executor to the first executor; and
proceed to the next iteration by setting the updated placement information as the placement information for the next iteration.

11. The non-transitory computer readable medium of claim 10, wherein the first executor is an executor with the first execution statistic that is a lowest execution statistic for the subset of partition tasks assigned to the stateful operator and the second executor is an executor with the second execution statistic that is a highest execution statistic for the subset of partition tasks assigned to the stateful operator.

12. The non-transitory computer readable medium of claim 8, the one or more stateful operators comprising two or more stateful operators, and the instructions further cause the computing devices to:
for one or more iterations:
based on the placement information for a current iteration, select a third executor with a third execution statistic for the subset of partition tasks assigned to the two or more stateful operators and a fourth executor with a fourth execution statistic for the subset of partition tasks assigned to the two or more stateful operators;
if the third execution statistic and the fourth execution statistic satisfy a second condition, use the placement information of the current iteration to generate the preferred locations for the second batch of data;
else, iteratively performing, for each stateful operator:
move a number of partition tasks assigned to the stateful operator from the fourth executor to the third executor until the second condition for the third executor and the fourth executor is satisfied;
update the placement information with updated execution statistics reflecting the partition tasks moved from the fourth executor to the third executor; and
proceed to the next iteration by setting the updated placement information as the placement information for the next iteration.

13. The non-transitory computer readable medium of claim 12, wherein the third executor is an executor with the third execution statistic that is a lowest execution statistic for the subset of partition tasks assigned to the two or more stateful operators and the fourth executor is an executor with the fourth execution statistic that is a highest execution statistic for the subset of partition tasks assigned to the two or more stateful operators.

14. The non-transitory computer readable medium of claim 8, the instructions further causing the computing devices to store the state for the respective subset of partitions tasks to a cloud object storage and also on a cache memory of the executor.

15. A computer system, comprising:
a computer processor; and
a non-transitory computer-readable storage medium comprising instructions that when executed by the computer processor, cause the computer system to:
receive, at a first time, a first batch of data including data associated with one or more keys;
schedule a set of partition tasks for one or more stateful operators for the first batch of data on one or more executor, a partition task corresponding to a respective stateful operator on data associated with a respective subset of keys;
execute the set of partition tasks on the first batch of data, the instructions further causing an executor to execute a respective subset of partition tasks and store a state for the respective subset of partitions tasks to storage;
receive placement information indicating locations of the set of partition tasks on the one or more executors;
receive, at a second time subsequent the first time, a second batch of data including additional data associated with the one or more keys;
compute preferred locations of the set of partition tasks for the second batch of data, the preferred locations indicating assignment of at least one partition task on an executor to another executor based on an execution statistic;
schedule the set of partition tasks for the second batch of data according to the preferred locations; and
execute, by the another executor, the at least one partition task based on the second batch of data responsive to retrieving the state for the at least one partition task from the storage.

16. The computer system of claim 15, the execution statistic for an executor one or a combination of a number of partition tasks executed on the executor, a size of partition tasks executed on the executor, or a latency or processing time for executing partition tasks on the executor.

17. The computer system of claim 15, the instructions causing the computer system to:
for a stateful operator, perform for one or more iterations:
based on the placement information for a current iteration, select a first executor with a first execution statistics for the subset of partition tasks and a second executor with a second execution statistics for the subset of partition tasks;
if the first execution statistic and the second execution statistic satisfy a condition, use the placement information of the current iteration to generate the preferred locations for the second batch of data;
else, move a number of partition tasks from the second executor to the first executor;
update the placement information with updated execution statistics reflecting the partition tasks moved from the second executor to the first executor; and
proceed to the next iteration by setting the updated placement information as the placement information for the next iteration.

18. The computer system of claim 17, wherein the first executor is an executor with the first execution statistic that is a lowest execution statistic for the subset of partition tasks assigned to the stateful operator and the second executor is an executor with the second execution statistic that is a highest execution statistic for the subset of partition tasks assigned to the stateful operator.

19. The computer system of claim 15, the one or more stateful operators comprising two or more stateful operators, and the instructions further cause the computer system to:
for one or more iterations:
based on the placement information for a current iteration, select a third executor with a third execution statistic for the subset of partition tasks assigned to the two or more stateful operators and a fourth executor with a fourth execution statistic for the subset of partition tasks assigned to the two or more stateful operators;
if the third execution statistic and the fourth execution statistic satisfy a second condition, use the placement information of the current iteration to generate the preferred locations for the second batch of data;
else, iteratively performing, for each stateful operator:
move a number of partition tasks assigned to the stateful operator from the fourth executor to the third executor until the second condition for the third executor and the fourth executor is satisfied;
update the placement information with updated execution statistics reflecting the partition tasks moved from the fourth executor to the third executor; and
proceed to the next iteration by setting the updated placement information as the placement information for the next iteration.

20. The computer system of claim 15, the instructions further causing the computer system to store the state for the respective subset of partitions tasks to a cloud object storage and also on a cache memory of the executor.

* * * * *